United States Patent [19]

Tsunoda et al.

[11] Patent Number: 4,532,522
[45] Date of Patent: Jul. 30, 1985

[54] OPTICAL RECORDING APPARATUS

[75] Inventors: Yoshito Tsunoda, Mitaka; Takeshi Maeda, Kokubunji; Shigeru Nakamura; Toshimitsu Kaku, both of Hachioji, all of Japan

[73] Assignee: Hitachi, Ltd., Tokyo, Japan

[21] Appl. No.: 408,678

[22] Filed: Aug. 16, 1982

[30] Foreign Application Priority Data

Aug. 28, 1981 [JP] Japan ............................ 56-134070

[51] Int. Cl.³ .................... G11B 7/00; G11B 21/10
[52] U.S. Cl. ..................................... 346/44; 369/46;
250/202; 346/76 L; 360/77
[58] Field of Search ................ 369/44, 46, 103, 109,
369/111; 250/202; 350/3.7, 3.72, 162.17;
346/76 L; 360/77

[56] References Cited

U.S. PATENT DOCUMENTS

| | | | |
|---|---|---|---|
| 3,767,310 | 10/1973 | Dickson | 350/3.7 |
| 3,876,842 | 4/1975 | Bouwhuis | 369/46 |
| 4,037,252 | 7/1977 | Janssen | 369/46 |
| 4,133,600 | 1/1979 | Russell | 350/3.72 |
| 4,148,549 | 4/1979 | Termanis | 350/3.7 |
| 4,205,338 | 5/1980 | Shaefer | 369/46 |
| 4,298,974 | 11/1981 | Tsunoda | 369/44 |

FOREIGN PATENT DOCUMENTS

| | | | |
|---|---|---|---|
| 20904 | 2/1978 | Japan | 369/46 |
| 113139 | 9/1980 | Japan | 369/46 |

Primary Examiner—Alan Faber
Attorney, Agent, or Firm—Antonelli, Terry & Wands

[57] ABSTRACT

An optical recording apparatus wherein in front and rear of a first light spot for recording predetermined information along a guide groove provided in a recording medium beforehand, two second light spots and two third light spots are arranged along the guide groove and in a manner to mutually deviate from the center of the guide groove; the second light spots are arranged in an area with no information recorded therein, while the third light spots are arranged in an area with the information recorded therein; and the position of the first light spot is controlled on the basis of the difference between the quantities of light of the second light spots and the difference between the quantities of light of the third light spots, so as to track the information.

18 Claims, 8 Drawing Figures

OPTICAL RECORDING APPARATUS

BACKGROUND OF THE INVENTION

The present invention relates to an optical recording apparatus, and more particularly to an apparatus for tracking information in an optical disc memory which records and plays back the information in real time.

Heretofore, the technique of tracking an information track at an exactitude on the order of ±0.1 μm has been indispensable in case of playing back information from the surface of a disc, such as optical video disc and PCM optical disc, on which the information are recorded along tracks in advance. As a typical method therefor, there has been known one in which, as illustrated in FIGS. 1(A) and 1(B), three light spots are formed on the disc surface and are used for the tracking. This method will now be described. In the arrangement of FIG. 1(A), a laser beam 2 emergent from a laser source 1 is collimated by a lens 3 into a parallel beam, which is split into the three light rays of a 0-order diffracted light ray and ±1-order diffracted light rays by a diffraction grating 4. Thereafter, the light rays are reflected by a mirror 15 and are condensed as three light spots 6a, 6b and 6c on the disc 7 by a condensing lens 5. The three light spots 6a, 6b and 6c are formed on the track 16 of the disc 7 in a manner to have an inclination $\theta$ with respect to the direction of the track as shown in FIG. 1(B). A reflected beam from the surface of the disc 7 is led onto photodetectors 10a, 10b and 10c by a semitransparent mirror 8 and a lens 9. At this time, the light spots 6a, 6b and 6c are respectively detected in correspondence with the photodetectors 10a, 10b and 10c. An output from the photodetector 10b is led to a signal playback circuit (not shown) via an amplifier 12. Outputs from the photodetectors 10a and 10c pass through a differential amplifier 11 to become a differential output. After passing through a servo circuit 3, the differential output is led to a driver 14 for the mirror 15 so as to rotate the mirror 15 in correspondence with a tracking error as indicated by arrows, whereby the tracking is performed. More specifically, when the track 16 has deviated rightward as viewed in FIG. 1(A), the quantity of reflected light from the light spot 6a decreases, whereas that from the light spot 6c increases. When the track 16 has deviated leftward, the converse is true. The mirror 15 may be so controlled that the quantities of reflected light from the light spots 6a and 6b, namely, the outputs from the photodetectors 10a and 10c become equal at all times. This method can perform a stable tracking in a case where the information are already formed on the track as in the optical video disc or optical PCM disc. However, it has hitherto had a serious disadvantage as to a digital optical disc which records and plays back digital information, video information etc. in real time.

Hereunder, this disadvantage will be explained. As the digital optical disc, a disc of a structure as shown in FIG. 2(A) (partial enlarged view) has heretofore been used. Referring to the figure, guide grooves 23 of a concave sectional structure having a certain degree of width and depth are previously formed on a substrate 21 of glass or plastics by the use of an ultraviolet-hardenable resin or the like, and a metal film 20 is evaporated thereon. In recording information, a light spot is guided along the guide groove 23 in a manner to track this guide groove, so as to melt the metal film 20 by the light spot. The information are recorded by the melted parts 22 (called "pits"). When the guide groove 23 bearing the information thus recorded is tracked by the arrangement of the light spots as shown in FIG. 1(B), the information are played back by the light spot 6b and the tracking signal is produced by the light spots 6a and 6c, as illustrated in FIG. 2(B). However, the light spot 6a lies in an area where the information is not recorded, and the light spot 6c lies in an area where the information is recorded, so that the quantities of reflected light from the corresponding areas do not equalize even in the absence of the tracking error. Moreover, the inequality varies greatly depending upon the pattern of the recorded information, namely, the arrayal pattern of the pits, so that the precision of the tracking worsens drastically.

SUMMARY OF THE INVENTION

An object of the present invention is to eliminate such disadvantage of the prior-art information tracking apparatus and to provide an information tracking apparatus of high precision.

The present invention for accomplishing the object is characterized in that at least two light spots which deviate slightly in the opposite directions with respect to the direction of a guide groove are arranged in front or/and to the rear of a light spot for recording or playing back information.

PREFERRED EMBODIMENTS OF THE INVENTION

Figure 1A:
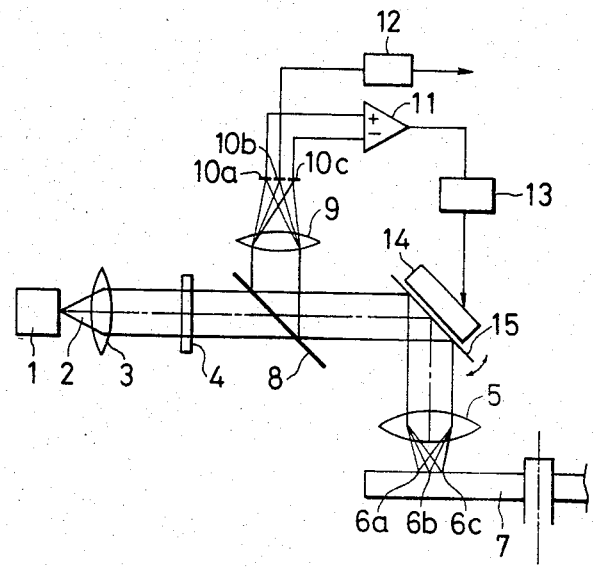
FIGS. 1(A) and 1(B) are diagrams for explaining the conventional information tracking of an optical video disc or a PCM optical disc.
Figure 1B:
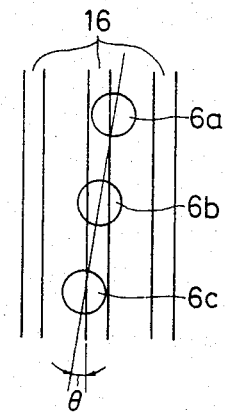
Figure 2A:
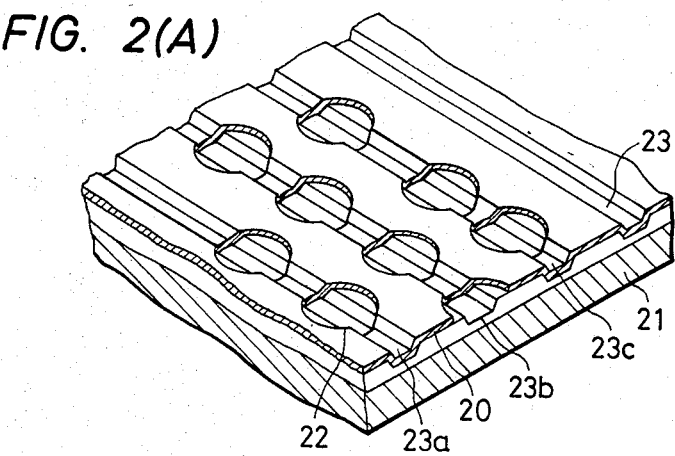
FIGS. 2(A) and 2(B) are diagrams for explaining the information tracking of a digital optical disc.
Figure 2B:
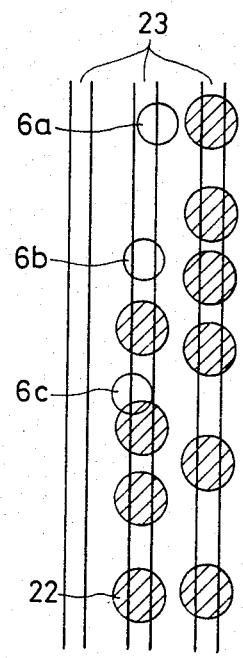
Figure 3:
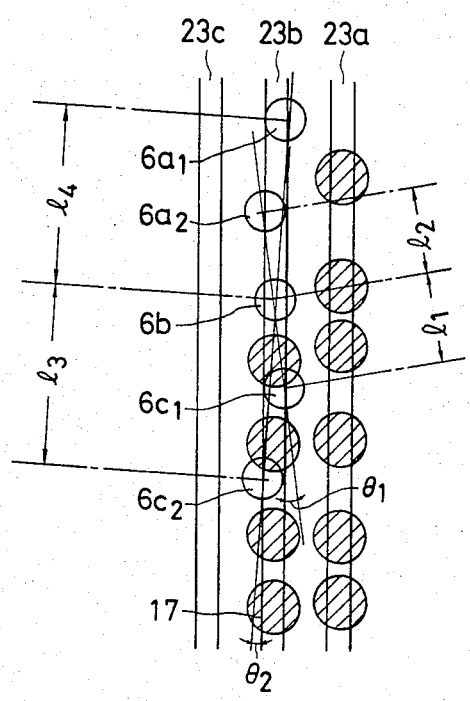
FIG. 3 is a diagram for explaining the principle of the present invention.
Figure 4:
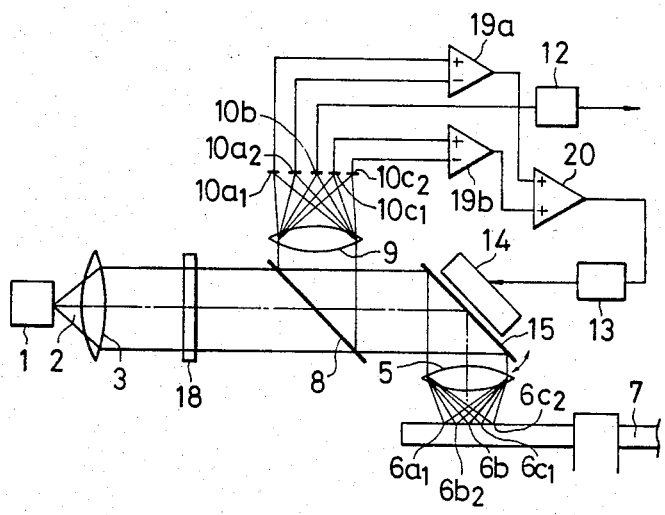
FIG. 4 is a diagram for explaining information tracking in the present invention.

FIG. 3 is a diagram for explaining an embodiment of the present invention. Five light spots $6a_1$, $6a_2$, $6b$, $6c_1$ and $6c_2$ are formed on a guide groove $23b$. The light spot $6b$ is used for recording or playing back information. The light spots $6a_1$ and $6c_1$ are arranged in a manner to slightly deviate on the right of the guide groove $23b$, whereas the light spots $6a_2$ and $6c_2$ are arranged in a manner to slightly deviate on the left. In addition, the light spots $6a_1$, $6b$ and $6c_2$ are collinear and define an angle $\theta_2$ with the guide groove, and the distances between the respectively adjacent light spots are $l_4$ and $l_3$. Further, the light spots $6a_2$, $6b$ and $6c_1$ are collinear and define an angle $\theta_1$ with the guide groove, and the distances between the respectively adjacent light spots are $l_2$ and $l_1$. While arbitrary values may be selected as to these quantities $\theta_1$, $\theta_2$, $l_1$, $l_2$, $l_3$ and $l_4$, it is generally recommended to set $l_1=l_2$, $l_3=l_4$ and $l_1\theta_1=l_3\theta_2$. In order to track the guide groove by the use of the light spots, there may be detected the difference between the quantities of reflected light of the light spots $6a_1$ and $6a_2$, the difference between the quantities of reflected light of the light spots $6c_1$ and $6c_2$, or the sum between these differences. FIG. 4 is a diagram for explaining the construction of an embodiment of the present invention.

In FIG. 4, a laser beam 2 emergent from a laser 1 is collimated by a lens 3 into a parallel beam, which passes through a diffraction grating 18 for forming the multiplicity of light spots and is reflected by a mirror 15. Thereafter, the reflected beam is condensed as the light spots $6a_1$, $6a_2$, $6b$, $6c_1$ and $6c_2$ by a condensing lens 5. The arrangement of the light spots for a track on the surface of a disc 7 is as shown in FIG. 3. A reflected beam from the surface of the disc 7 is led to photodetectors $10a_1$, $10a_2$, $10b$, $10c_1$ and $10c_2$ by a semitransparent mirror 8. The light spots $6a_1$, $6a_2$, $6b$, $6c_1$ and $6c_2$ correspond to the photodetectors $10a_1$, $10a_2$, $10b$, $10c_1$ and $10c_2$, respectively. Among detection output signals from the photodetectors, the output from the photodetector $10b$ is led to a signal playback circuit via an amplifier 12. The outputs of the photodetectors $10a_1$ and $10a_2$ are led to a differential amplifier $19a$, while the outputs of the photodetectors $10c_1$ and $10c_2$ are led to a differential amplifier $19b$. The outputs of the respective differential amplifiers are the difference of the reflected light quantities of the light spots $6a_1$ and $6a_2$ and the difference of the reflected light quantities of the light spots $6c_1$ and $6c_2$, and they contain information on a tracking error. These two differential outputs are added up by a cumulative amplifier 20. The resulting output is led via a servo circuit 13 to a driver 14 for the mirror 15, so as to rotate the mirror 15 in correspondence with the tracking error. It is also possible to perform the tracking by utilizing only the output of either the differential amplifier $19a$ or $19b$. In this case, the differential output may be led to the servo circuit 13 directly without passing through the cumulative amplifier 20. In general, however, a stabler tracking is permitted by taking the sum of the two differential outputs. The reason will now be described. Since the light spots $6a_1$ and $6a_2$ exist on one side (in front) of the information recording or playing-back light spot $6b$, both lie in areas where no information is recorded, and the quantities of reflected light thereof equalize in the absence of any tracking error. On the other hand, both the light spots $6c_1$ and $6c_2$ lie in areas where information are recorded, and the quantities of reflected light equalize in the absence of any tracking error, similarly to the above. However, when the quantities of light of the light spots $6a_1$ and $6a_2$ or those of the light spots $6c_1$ and $6c_2$ are originally unequal, the quantities of reflected light thereof do not equalize, so that the tracking precision is worsened. In general, when it is intended to form a multiplicity of light spots by means of a diffraction grating, the light spots $6a_1$, $6c_2$ and $6a_2$, $6c_1$ which lie in the positions symmetric to the 0-order light spot $6b$ equalize in the quantity of light because they have the relationship of $\pm 1$-order diffracted light rays, but it is difficult to make the combination $6a_1$, $6a_2$ or $6c_1$, $6c_2$ equal in the quantity of light. Such inequality, however, can be removed by summing the outputs of the differential amplifiers $19a$ and $19b$.

Figure 5:
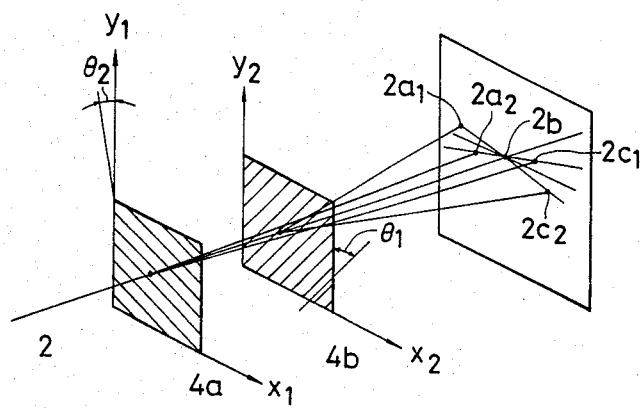
FIGS. 5 and 6 are diagrams for explaining diffraction gratings for use in the present invention.

FIG. 5 is a diagram for explaining a diffraction grating which is used for forming a multiplicity of light spots in the present invention. The diffraction grating consists of two grating plates $4a$ and $4b$. The direction of the grating of the grating plate $4a$ defines an angle $-\theta_2$ to $y_1$ within an xy-plane perpendicular to the incident laser beam 2. The direction of the grating of the grating plate $4b$ defines an angle $\theta_1$ to $y_2$. Regarding the pitches P of the respective gratings, letting f denote the focal distance of the condensing lens, $\lambda$ denote the wavelength of the laser, $l_1$ ($=l_2$) denote the distance between the light spots $6b$ and $6a_2$ on the disc surface, and $l_3$ ($=l_4$) denote the distance between the light spots $6b$ and $6a_1$, the pitch $P_{4a}$ of the diffraction grating plate $4a$ may be made:

$$P_{4a} = \lambda / \sin(l_1/f)$$

and the pitch $P_{4b}$ of the plate $4b$:

$$P_{4b} = \lambda / \sin(l_3/f)$$

By employing such two diffraction grating plates, the laser beam 2 becomes a multiplicity of beams $2a_1$, $2a_2$, $2b$, $2c_1$ and $2c_2$. The beams $2a_1$, $2b$ and $2c_2$ have been formed by the diffraction grating plate $4a$, while the beams $2a_2$, $2b$ and $2c_1$ have been formed by the diffraction grating plate $4b$. In correspondence with these beams, the light spots $6a_1$, $6a_2$, $6b$, $6c_1$ and $6c_2$ are formed on the disc surface. By rotating the diffraction grating plates $4a$ and $4b$, the angles between the light spots and the track can be readily adjusted. In case of performing the actual tracking, the angles of the diffraction grating plates $4a$ and $4b$ may be adjusted so as to produce the optimum signals. As regards the intensities of the respective light spots, the diffraction grating plates may be so fabricated that, supposing the intensity of the laser beam to be 1 (unity) by way of example, the intensity of each of the light spots $6a_1$, $6a_2$, $6c_1$ and $6c_2$ becomes about 0.05, while the intensity of the light spot $6b$ becomes about 0.8.

Figure 6:
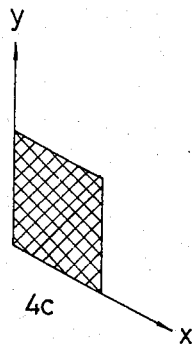

FIG. 6 is a diagram for explaining another diffraction grating which is used for forming a multiplicity of light spots in the present invention. The diffraction grating $4c$ has two-dimensional gratings which define angles $\theta_1$ and $-\theta_2$ to the y-direction, respectively. The pitches of the respective gratings are similar to the above-mentioned ones. Besides, as the diffraction grating, it is possible to use, e.g., a hologram device. A hologram capable of generating the light spots $6a_1$, $6a_2$, $6b$, $6c_1$ and $6c_2$ may be fabricated in advance and used as the diffraction grating.

Regarding the guide groove formed in the disc surface beforehand, the depth and width are not especially regulated, but a groove about 0.4–0.8 μm wide and about $\lambda/4 - \lambda/8$ (where $\lambda$ indicates the wavelength of the laser) deep is suitable by way of example. Further, the information recording film is not especially regulated, either, but a film containing Te, Se, As, Pb, In or the like and having a thickness of about 100–500 Å may be used by way of example.

As set forth above, according to the present invention, in a digital optical disc apparatus which records and plays back information in real time, a stable tracking is realized with the simple arrangement of an optical system.

We claim:

1. In an optical recording apparatus having a light source which emits a laser beam; a recording medium on and from which predetermined information are optically recorded and played back along a guide groove provided beforehand; optical means arranged between the light source and the medium and for leading the laser beam from the light source to the recording medium; light receiving means for receiving reflected light from the recording medium; generation means for generating a tracking signal on the basis of an output from the light receiving means, the laser beam tracking the guide groove in accordance with the tracking signal;

and control means for controlling the laser beam so that the laser beam may track the guide groove in accordance with the tracking signal from the generation means;

an optical recording apparatus characterized in that said optical means comprises an optical element which separates said laser beam into a first laser beam, a plurality of second laser beams and a plurality of third laser beams, and which arranges said first laser beam on said guide groove, arranges said plurality of second laser beams and said plurality of third laser beams in front and to the rear of said first laser beam respectively and along said guide groove in a manner to mutually deviate from a center of said guide groove, and arranges said second laser beams in an area with no information recorded therein and said third laser beams in an area with information recorded therein; and that said generation means comprises first means for evaluating a difference between light quantities of said plurality of second laser beams, and second means for evaluating a difference between light quantities of said plurality of third laser beams, the outputs of these means being applied to said control means.

2. An optical recording apparatus according to claim 1, wherein said optical element is constructed of two diffraction gratings, and said diffraction gratings are rotated, thereby to form said first laser beam, said second laser beams and said third laser beams.

3. An optical recording apparatus according to claim 2, wherein said optical element is made of a hologram.

4. An optical recording apparatus according to claim 1, wherein said generation means further comprises third means for taking a sum between the output of said first means and the output of said second means, and the output of said third means is applied to said control means.

5. An optical recording apparatus according to claim 1, wherein said optical means comprising said optical element separates said laser beam into said first laser beam for delimiting a light spot on said guide groove of said recording medium, said plurality of second laser beams including first and second second laser beams for delimiting first and second light spots arranged along said guide groove in front of said light spot of said first laser beam, and said plurality of third laser beams including first and second third laser beams for delimiting first and second light spots arranged along said guide groove to the rear of said light spot of said first laser beam.

6. An optical recording apparatus according to claim 5, wherein one of said first and second light spots of said second laser beams and one of said first and second light spots of said third laser beams are collinear with said light spot of said first laser beam, and the other of said first and second light spots of said second laser beams and the other of said first and second light spots of said third laser beams are collinear with said light spot of said first laser beam.

7. In an optical recording apparatus having a light source which emits a laser beam; a recording medium on and from which predetermined information are optically recorded and played back along a guide groove provided beforehand; optical means arranged between the light source and the medium and for leading the laser beam from the light source to the recording medium; light receiving means for receiving reflected light from the recording medium; generation means for generating a tracking signal on the basis of an output from the light receiving means, the laser beam tracking the guide groove in accordance with the tracking signal; and control means for controlling the laser beam so that the laser beam may track the guide groove in accordance with the tracking signal from the generation means;

an optical recording apparatus characterized in that said optical means comprises an optical element which separates said laser beam into a first laser beam, a plurality of second laser beams and a plurality of third laser beams, and which arranges said first laser beam on said guide groove, arranges said plurality of second laser beams and said plurality of third laser beams in front and to the rear of said first laser beam respectively and along said guide groove in a manner to mutually deviate from a center of said guide groove, and arranges said second laser beams in an area with no information recorded therein and said third laser beams in an area with information recorded therein; that said light receiving means comprises a plurality of light receiving elements which receive said first laser beam, said second laser beams and said third laser beams, respectively; and that said generation means comprises first means for evaluating a difference between outputs of said light receiving elements receiving said plurality of second laser beams, and a difference between outputs of said light receiving elements receiving said plurality of third laser beams, the outputs of said first and second means being applied to said control means.

8. An optical recording apparatus according to claim 7, wherein said optical element is constructed of two diffraction gratings, and said diffraction gratings are rotated, thereby to form said first laser beam, said second laser beams and said third laser beams.

9. An optical recording apparatus according to claim 8, wherein said optical element is made of a hologram.

10. An optical recording apparatus according to claim 7, wherein said generation means further comprises third means for taking a sum between the output of said first means and the output of said second means, and the output of said third means is applied to said control means.

11. An optical recording apparatus according to claim 7, wherein said optical means comprising said optical element separates said laser beam into said first laser beam for delimiting a light spot on said guide groove of said recording medium, said plurality of second laser beams including first and second laser beams for delimiting first and second light spots arranted along said guide groove in front of said light spot of said first laser beam, and said plurality of third laser beams including first and second third laser beams for delimiting first and second light spots arranged along said guide groove to the rear of said light spot of said first laser beam.

12. An optical recording apparatus according to claim 11, wherein one of said first and second light spots of said second laser beams and one of said first and second light spots of said third laser beams are collinear with said light spot of said first laser beam, and the other of said first and second light spots of said second laser beams and the other of said first and second light spots of said third laser beams are collinear with said light spot of said first laser beam.

13. In an optical recording apparatus having a light source which emits a laser beam; a recording medium on and from which predetermined information are optically recorded and played back along a guide groove provided beforehand; optical means arranged between the light source and the medium and for leading the laser beam from the light source to the recording medium; light receiving means for receiving reflected light from the recording medium; generation means for generating a tracking signal on the basis of an output from the light receiving means, the laser beam tracking the guide groove in accordance with the tracking signal; and control means for controlling the laser beam so that the laser beam may track the guide groove in accordance with the tracking signal from the generation means;

an optical recording apparatus characterized in that said optical means comprises an optical element which separates said laser beam into a first laser beam, second laser beams No. 1 and No. 2, and third laser beams No. 1 and No. 2, and which arranges said first laser beam on said guide groove, arranges said second laser beams No. 1 and No. 2 in an area with no information recorded therein and locates them in a manner to mutually deviate from a center of said guide groove, and arranges said third laser beams No. 1 and No. 2 in an area with information recorded therein and locates them in a manner to mutually deviate from the center of said guide groove; that said light receiving means comprises light receiving elements which receive said first laser beam, said second laser beam No. 1, said second laser beam No. 2, said third laser beam No. 1 and said third laser beam No. 2, respectively; and that said generation means comprises first means for evaluating a difference between outputs of said light receiving elements receiving said second laser beams No. 1 and No. 2, and second means for evaluating a difference between outputs of said light receiving elements receiving said third laser beams No. 1 and No. 2, the outputs of said first and second means being applied to said control means.

14. An optical recording apparatus according to claim 13, wherein said optical element is constructed of two diffraction gratings, and said diffraction gratings are rotated, thereby to form said first laser beam, said second laser beams and said third laser beams.

15. An optical recording apparatus according to claim 14, wherein said optical element is made of a hologram.

16. An optical recording apparatus according to claim 13, wherein said generation means further comprises third means for taking a sum between the output of said first means and the output of said second means, and the output of said third means is applied to said control means.

17. An optical recording apparatus according to claim 13, wherein said optical means comprising said optical element separates said laser beam into said first laser beam for delimiting a light spot on said guide groove of said recording medium, said No. 1 and No. 2 second laser beams for delimiting first and second light spots arranged along said guide groove in front of said light spot of said first laser beam, and said No. 1 and No. 2 third laser beams for delimiting first and second light spots arranged along said guide groove to the rear of said light spot of said first laser beam.

18. An optical recording apparatus according to claim 17, wherein one of said first and second light spots of said No. 1 and No. 2 second laser beams and one of said first and second light spots of said No. 1 and No. 2 third laser beams are collinear with said light spot of said first laser beam, and the other of said first and second light spots of said No. 1 and No. 2 second laser beams and the other of said first and second light spots of said No. 1 and No. 2 third laser beams are collinear with said light spot of said first laser beam.

* * * * *